United States Patent
Ashida et al.

(10) Patent No.: US 6,897,982 B1
(45) Date of Patent: May 24, 2005

(54) IMAGE-WRITING DEVICE AND METHOD AND IMAGE-FORMING APPARATUS REDUCING DOT WIDTH VARIATIONS IN RELATION TO A SCREEN ANGLE

(75) Inventors: Kenichi Ashida, Tokyo (JP); Norio Nakajima, Tokyo (JP)

(73) Assignee: Oki Data Corporation, Tokyo (JP)

( * ) Notice: Subject to any disclaimer, the term of this patent is extended or adjusted under 35 U.S.C. 154(b) by 723 days.

(21) Appl. No.: 09/624,941

(22) Filed: Jul. 25, 2000

(30) Foreign Application Priority Data

Aug. 27, 1999 (JP) ............................................ 11-241194

(51) Int. Cl.$^7$ .............................................. G06K 15/00
(52) U.S. Cl. ....................... 358/3.09; 358/3.12; 358/534
(58) Field of Search .............................. 358/3.09, 3.11, 358/3.12, 3.1, 515, 534, 536

(56) References Cited

U.S. PATENT DOCUMENTS

| | | | |
|---|---|---|---|
| 5,055,923 A | * 10/1991 | Kitagawa et al. | ........... 358/534 |
| 5,220,432 A | * 6/1993 | Roe et al. | .................... 358/534 |
| 5,359,424 A | * 10/1994 | Kobayashi | ................... 358/296 |
| 5,436,644 A | * 7/1995 | Motoi et al. | ................. 347/256 |

OTHER PUBLICATIONS

Tajima, "Color Image Reproduction Theory," *Maruzen*, pp. 120–123, (1996).

* cited by examiner

*Primary Examiner*—Thomas D. Lee
(74) *Attorney, Agent, or Firm*—Akin Gump Strauss Hauer & Feld, LLP

(57) ABSTRACT

An image-writing device writes a dot image onto an image-receiving body in such a way that the dots align at a certain screen angle. The dots are written by an array of writing elements such as light-emitting diodes. The image-writing device has a memory that stores compensation parameters that compensate for non-uniformity of the writing elements. The compensation parameters are also calculated to produce dots with approximately uniform widths as viewed in the screen-angle direction. When driven according to the compensation parameters, the writing elements produce a dot image that is comparatively free of dot-width irregularities aligned in the screen-angle direction, which is the direction in which such irregularities are most noticeable.

22 Claims, 9 Drawing Sheets

FIG. 4
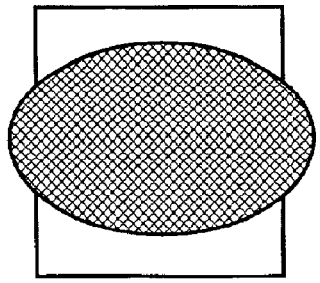
FIG.4D
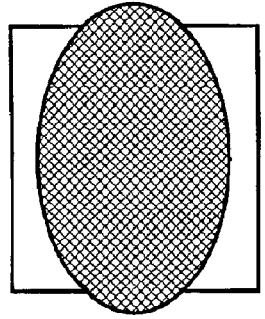
FIG.4C
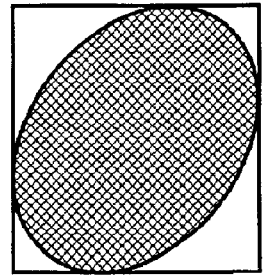
FIG.4B
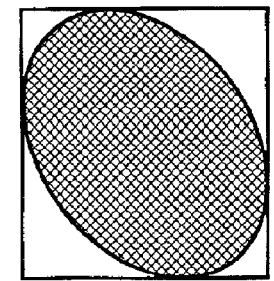
FIG.4A

IMAGE-WRITING DEVICE AND METHOD AND IMAGE-FORMING APPARATUS REDUCING DOT WIDTH VARIATIONS IN RELATION TO A SCREEN ANGLE

BACKGROUND OF THE INVENTION

The present invention relates to a method of controlling the sizes of dots written on an image-receiving body, an image-writing device employing this method, and an image-forming apparatus including this image-writing device.

Examples of image-forming apparatus to which the invention is applicable include electrophotographic color printers of the tandem type and intermediate transfer type. Like electrophotographic printers in general, these printers have an exposure unit, a photosensitive drum that functions as the image-receiving body, a developing unit, a transfer unit, a fusing unit, and a paper transport unit. The surface of the photosensitive drum is uniformly charged, then illuminated by the exposure unit to form an electrostatic latent image. The latent image is developed by application of toner particles in the developing unit. The resulting toner image is transferred to paper or other printing media in the transfer unit, and is permanently fused with the paper (or other media) by heat and pressure rollers in the fusing unit. A printer of the tandem type has a separate exposure unit, photosensitive drum, developing unit, and transfer unit for each primary color. A printer of the intermediate transfer type has an additional intermediate transfer drum to which the image is transferred one color at a time before being transferred in full color to the paper.

In these types of color printers, it is customary to print each primary color at a particular screen angle. This means that when colors are printed over large areas, dots of each primary color align in a particular direction. For example, dots of a first primary color may align vertically, while dots of a second primary color align diagonally in one direction, and dots of a third primary color align diagonally in another direction.

One type of exposure unit employed in these color printers is a light-emitting-diode printing head, referred to below as an LED head. An LED head includes a linear array of light-emitting diodes (LEDs) disposed in a plurality of LED array chips with a total length equal to or greater than the width of the printing media (e.g., the width of a sheet of paper of standard size). The LED head also includes a plurality of integrated driver circuits or driver ICs that drive the LEDs.

An LED head further includes a lens array such as, for example, the self-focusing or 'Selfoc' type of lens array manufactured by Nippon Sheet Glass Co. This is an array of glass cylinders that function as lenses, focusing the light emitted by the LEDs onto the surface of the photosensitive drum.

The LEDs in an LED head may differ in the intensity of the light they emit. It is known art to compensate for such differences by storing compensation parameters in a memory device and controlling the amount of driving energy supplied to the LEDs according to the compensation parameters so that each LED, when driven, delivers substantially the same amount of optical energy to the photosensitive drum.

This known compensation method fails to compensate for dot distortion caused by the lens array, however. Variations in the optical properties of the glass cylinders, non-uniform mounting of the glass cylinders in the lens array, and positional errors in the mounting of the lens array as a whole can cause the dots of light to be focused in a skewed manner, even if their energy remains uniform. Typically, the dots are distorted into ellipses, leading to reduced resolution in the direction of the long axes of the ellipses.

Dots that are distorted in this way can cause visible printing defects, particularly if the distortions are aligned with the screen angle of the dots. A conventional compensation scheme that equalizes the dot illumination energy to within ±2%, for example, is no defense against a lens array that distorts the dots so much as to cause resolution variations of ±10%.

SUMMARY OF THE INVENTION

An object of the present invention is to reduce dot width variations in the screen-angle direction.

According to a first aspect of the invention, an image-writing device writes an image onto an image-receiving body. The image includes dots aligned with respect to a screen angle. The image-writing device has a plurality of writing elements for writing the dots, a memory storing compensation parameters, and a driver for driving the writing elements according to the compensation parameters. The compensation parameters modify the dots so that they have substantially uniform widths as viewed in the screen-angle direction.

According to a second aspect of the invention, the image-writing device writes an electrostatic latent image onto the image-receiving body by illuminating the image-receiving body. The image includes dots aligned with respect to a screen angle. The image-writing device includes a plurality of light-emitting elements, a plurality of lenses that focus the emitted light onto the image-receiving body, a memory storing a first plurality of parameters corresponding to the light-emitting elements and a second plurality of parameters corresponding to the lenses, and a driver that drivers the light-emitting elements according to both the first and second pluralities of parameters, thereby causing the dots to have substantially uniform widths as viewed in the screen-angle direction.

According to a third aspect of the invention, the second plurality of parameters in the second aspect of the invention is replaced by parameters corresponding to different screen angles instead of different lenses.

According to a fourth aspect of the invention, an image-writing device writes an image onto an image-receiving body. The image includes dots aligned with respect to a screen angle. The sizes of the dots are controlled so that the dot widths vary less when viewed in the screen-angle direction than when viewed in other directions.

The invention also provides image-forming apparatus incorporating the above image-writing devices.

BRIEF DESCRIPTION OF THE DRAWINGS

In the attached drawings:

FIGS. 4A, 4B, 4C, and 4D illustrate distorted dots;

DETAILED DESCRIPTION OF THE INVENTION

Figure 1:
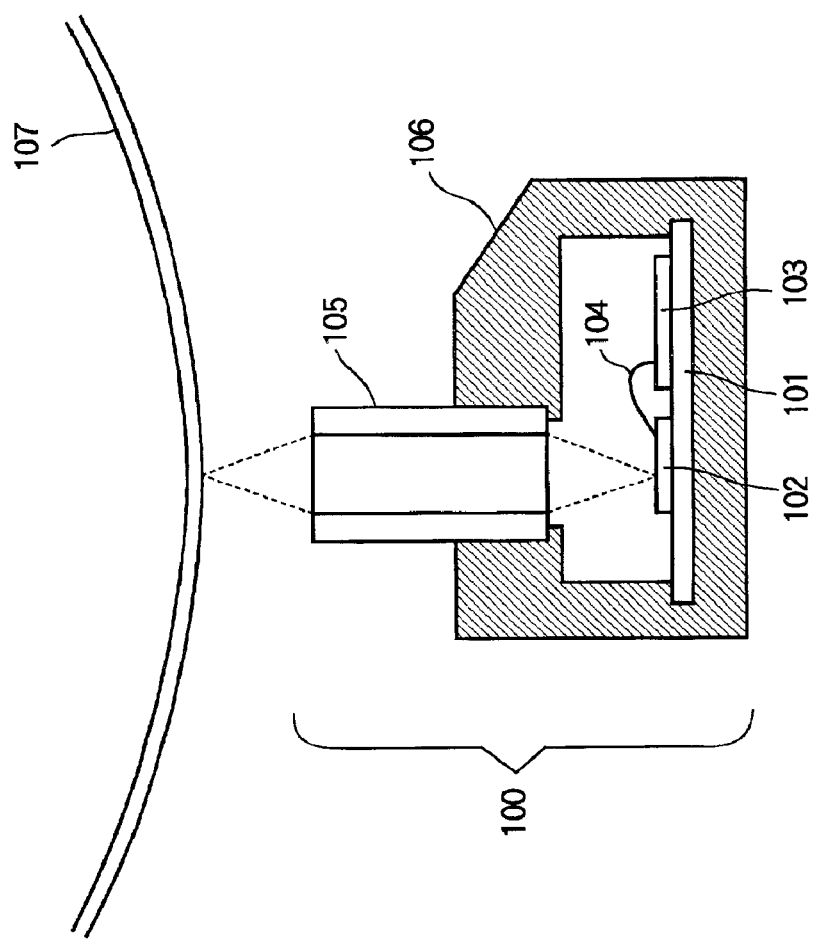
FIG. 1 is a sectional view of part of an electrophotographic printer with an LED head, illustrating first and second embodiments of the invention.

Embodiments of the invention will be described with reference to the attached drawings, in which like parts are indicated by like reference characters.

FIG. 1 shows a sectional view of an LED head 100 illustrating a first embodiment of the invention. Shown in the drawing are a printed wiring board 101, an LED array chip 102, a driver IC 103, a wire 104, a lens array 105, a housing 106 that supports the printed wiring board 101 and lens array 105, and the photosensitive drum 107 of the printer.

Figure 2:
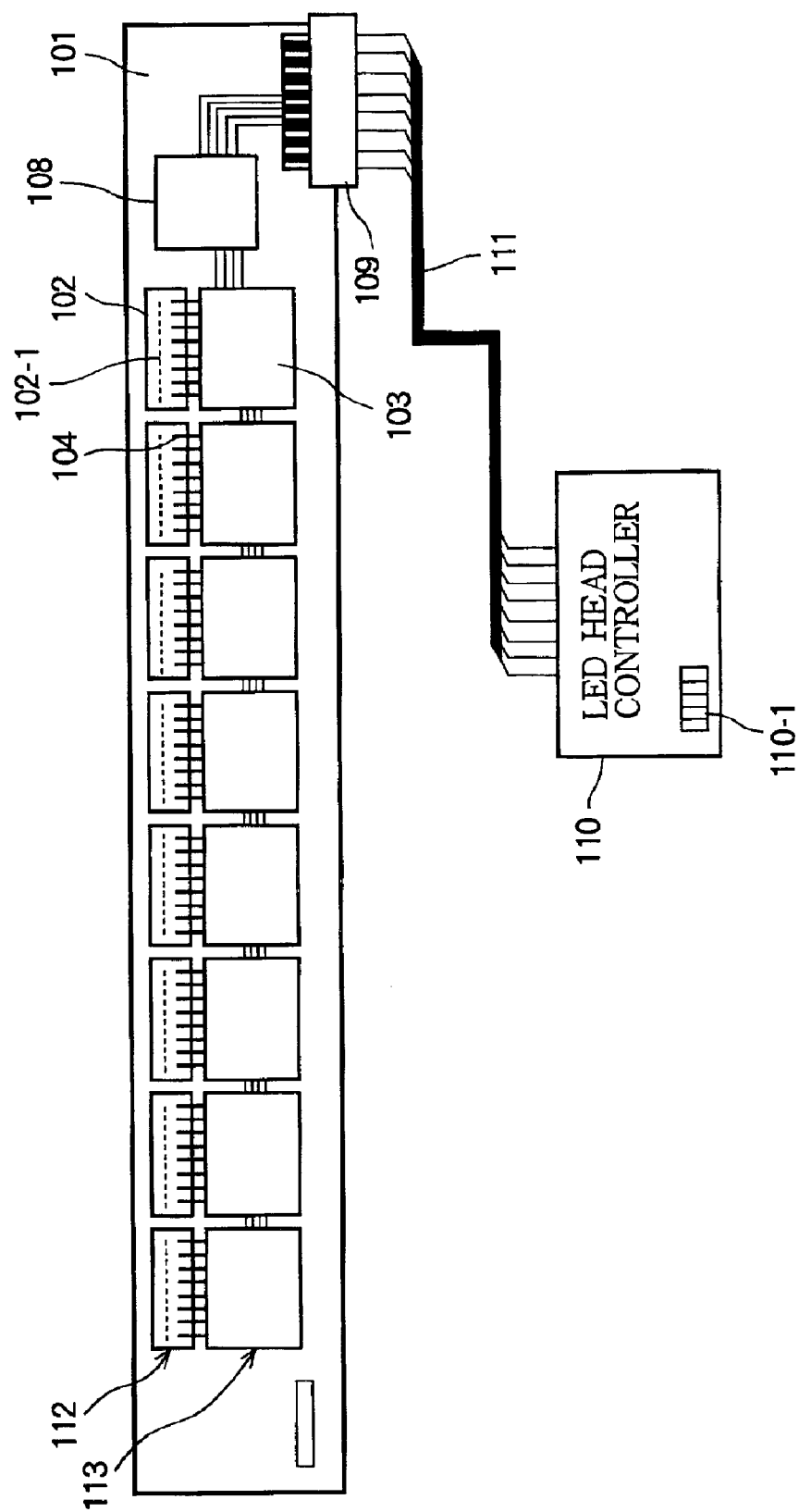
FIG. 2 is a plan view of the printed wiring board in the LED head in FIG. 1.

FIG. 2 shows a plan view of the printed wiring board 101. Besides a plurality of LED array chips 102, driver ICs 103, and wires 104, the printed wiring board 101 has a memory unit 108 and a connector 109. An LED head controller 110 in the printer is coupled to the connector 109 by a cable 111. The plurality of LED array chips 102 form an LED array 112. The plurality of driver ICs 103 form a driving circuit 113.

Referring to both FIGS. 1 and 2, the LED head 100 comprises the printed wiring board 101, the plurality of LED array chips 102 forming the LED array 112, the plurality of driver ICs 103 forming the driving circuit 113, the wires 104, the lens array 105, the housing 106, the memory unit 108, and the connector 109.

The printed wiring board 101 comprises, for example, a glass epoxy substrate with a conductive pattern formed from copper foil.

Each LED array chip 102 has, for example, a gallium arsenide phosphide (GaAsP) substrate in which one hundred ninety-two (192) light-emitting elements or LEDs 102-1 are formed at intervals of 42.3 $\mu$m (micrometers), this interval being suitable for printing with a resolution of six hundred dots per inch (600 dpi). For printing on paper of the standard A4 size, the LED array 112 comprises twenty-six such LED array chips 102, although a smaller number is shown in the drawing for convenience.

The driving circuit 113 parallels the LED array 112, one driver IC 103 being disposed next to each LED array chip 102. The LEDs 102-1 are driven individually from the driving circuit 113.

The wires 104 electrically couple the driver ICs 103 to the LED array chips 102. Other wires 104 (not visible) electrically couple the driver ICs 103 to the conductive patterns on the printed wiring board 101. The wires 104 are, for example, gold wires approximately 30 $\mu$m in diameter.

The lens array 105 is a staggered double row of glass cylinders with distributed indexes of refraction, each glass cylinder functioning as a lens. The cylinders are potted in a silicone filler material and are held between two fiber-reinforced plastic (FRP) plates having a low coefficient of thermal expansion. Light emitted from an LED 102-1 on the printed wiring board 101 travels a certain distance to the lens array 105, is refracted by a glass cylinder in the lens array 105, then travels another certain distance to form an erect dot image, equal in size to the emitted dot of light, on the; surface of the photosensitive drum 107. Each glass cylinder or lens serves several LEDs. The lens array 105 extends at least for the length of the LED array 112.

The memory unit 108 comprises at least one electrically readable and programmable memory device such as an electrically erasable and programmable read-only memory (EEPROM) or electrically programmable read-only memory (EPROM). Stored in this device are compensation parameters for adjusting the optical output of the LEDs. The optical output considered when these parameters are calculated is the LED exposure energy; that is, the energy of the light focused onto the surface of the photosensitive drum 107 by the lens array 105 after being emitted by an LED 102-1. The LED exposure energy should be distinguished from the LED exposure intensity, which is the intensity of the light focused onto the surface of the photosensitive drum 107 by the lens array 105 after being emitted by an LED 102-1.

The LED head controller 110 includes a compensation-parameter address register 110-1 that indicates the address at which the first compensation parameter is stored in the memory unit 108.

The LED head 100 operates as follows. Before printing begins, the LED head controller 110 transfers the compensation parameter values from the memory unit 108 to the driving circuit 113, starting from the address indicated in the compensation-parameter address register 110-1. The compensation parameters are stored in the driving circuit 113. During printing, the LED head controller 110 sends a stream of raster data to the driving circuit 113. The driving circuit 113 selectively drives (turns on) the LEDs in the LED array 112 according to the raster data, while controlling the exposure energy of the LEDs individually according to the compensation parameters received from the memory unit 108. The lens array 105 focuses the light emitted by the LEDs onto the uniformly charged surface of the photosensitive drum 107, forming an electrostatic latent image thereupon, the image comprising discharged dots corresponding to the raster data.

The LED exposure energy is expressed by the following equation (1).

$$LED \text{ exposure energy} = LED \text{ exposure intensity} \times \text{exposure time} \quad (1)$$

Although the LED exposure intensity depends partly on the optical characteristics of the lens array 105, it depends mainly on the driving current supplied to the individual LEDs. The driving circuit 113 can control the LED exposure energy by controlling either the driving current or the exposure time according to the compensation parameters.

In a conventional LED head, the compensation parameters are calculated to provide a uniform LED exposure energy, substantially eliminating differences in exposure energy from one LED to another. For a 600-dpi LED head, for example, the conventional compensation parameters are calculated to produce a uniform LED exposure energy in the range from twelve to fifteen picojoules (12–15 pJ) per LED.

In the first embodiment, however, the compensation parameters stored in the memory unit 108 are calculated to reduce both variations in LED exposure energy and variations in dot width in a direction aligned with the above-mentioned screen angle. Neither type of variation is completely eliminated, but variations in dot width in the screen-angle direction are greatly reduced.

Variations in dot shape and dot width will be described next.

Figure 3:
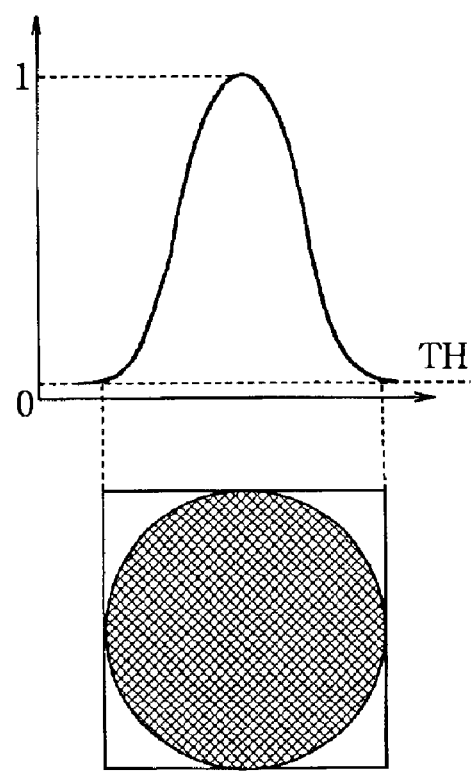
FIG. 3 illustrates an ideal illuminated dot.

If the glass-cylinder lenses in the lens array 105 are perfectly regular, illumination of the photosensitive drum 107 by light from the LEDs forms circular dots such as the one in FIG. 3. The hatched circle in FIG. 3 is a plan view of the dot; the graph shown above the dot is an energy profile through the center of the dot, the vertical (energy) scale being normalized so that the maximum energy is equal to unity. The dotted line marked TH is the sensitivity threshold of the photosensitive drum 107.

If the glass-cylinder lenses in the lens array 105 are not perfectly regular, or are incorrectly positioned within the lens array 105, or if the lens array 105 is imprecisely mounted, so that the focal points of the lenses are offset from the ideal points, LED illumination may form elliptical dots as shown in FIGS. 4A to 4D. The result of dot distortion of the type shown in FIGS. 4A to 4D is that even if the LED exposure energy is perfectly uniform, the dot width and hence the dot resolution are not uniform, and these irregularities carry over into the toner image and printed image. As mentioned above, these irregularities are particularly noticeable when they are aligned in the screen-angle direction.

As an example, the screen angles employed in a certain LED color printer of the tandem type will be described next. This printer has four LED heads 100 and four photosensitive drums 107, one for each of the colors yellow (Y), magenta (M), cyan (C), and black (K). Monochromatic toner images of these primary colors are formed on the four photosensitive drums 107, then transferred to a single sheet of paper (or other printing media) to create a full-color image.

In this type of printer, it is advantageous for different primary colors to have different screen angles. In the following discussion it will be assumed that the screen angle is −45° for yellow (Y), +45° for both magenta and black (M and K), and 90° for cyan (C).

When a solid yellow image, for example, is printed with a screen angle of −45°, yellow dots are printed in the odd-numbered dot positions in odd-numbered lines, and in the even-numbered dot positions in even-numbered lines. That is, yellow dots are printed in the first, third, fifth, . . . dot positions in the first line, in the second, fourth, sixth, . . . dot positions in the second line, and so on.

When a solid magenta or black image is printed with a screen angle of +45°, magenta or black dots are printed in the even-numbered dot positions in odd-numbered lines, and in the odd-numbered dot positions in even-numbered lines. In a solid magenta image, for example, magenta dots are printed in the second, fourth, sixth, . . . dot positions in the first line, in the first, third, fifth, . . . dot positions in the second line, and so on.

When a solid cyan image is printed with a screen angle of 90°., cyan dots are printed in the odd numbered dot positions, for example, in every line. That is, cyan dots are printed in the first, third, fifth, . . . dot positions in every line.

Similar considerations apply in image areas that are not solid colors. Yellow dots align with one another at angles of −45° to the horizontal direction, black and magenta dots align at angles of +45° to the horizontal direction, and cyan dots align at angles of 90° to the horizontal direction.

Next, the procedure for calculating the compensation parameters stored in the memory unit 108 in the first embodiment will be described. The compensation parameter for the i-th LED in the LED array 112 will be denoted Lcorrect(i) (i=1, 2, 3, . . . , $i_{max}$), where $i_{max}$ is the total number of LEDs in the LED array 112.

After the LED head 100 has been assembled, the LEDs in the LED array 112 are driven one at a time, and the light transmitted through the lens array 105 is captured by a charge-coupled device (CCD) camera disposed above the lens array 105. The LED exposure intensity of each LED is calculated from the digitized output of the CCD camera, and a separate parameter value is calculated for each LED. These parameters, denoted Pcorrect(i) (i=1, 2, 3, . . . , $i_{max}$), are calculated so as to produce uniform LED exposure energy, as in a conventional LED head.

Next, all of the odd-numbered LEDs in the LED array 112 are driven simultaneously, and the resulting image is captured by the CCD camera. Similarly, the even-numbered LEDs are driven simultaneously, and the resulting image is captured by the CCD camera. These two images are digitized, then used to calculate width-ratio parameters that will be denoted WDratio i) (i=1, 2, 3, . . . , $i_{max}$).

To calculate the width-ratio parameter values, the digitized images are normalized so that the peak brightness value in each image is equal to unity, and the normalized images are converted to bi-level images by comparison with a predetermined threshold such as $1/e^2$, where e is the natural logarithm base. Next, the width of the bi-level dots, as viewed in the direction parallel to the screen angle, is determined. The width-ratio parameters WDratio(i) are calculated so as to equalize the width of the bi-level dots as viewed in the screen-angle direction.

For a 600-dpi LED array 112, the array pitch is 25.4/600 millimeters or substantially 42.3 µm, as noted earlier. The width-ratio parameter values are accordingly calculated so that the width of the exposed dots is 42.3 µm as viewed in the screen-angle direction.

Figure 5:
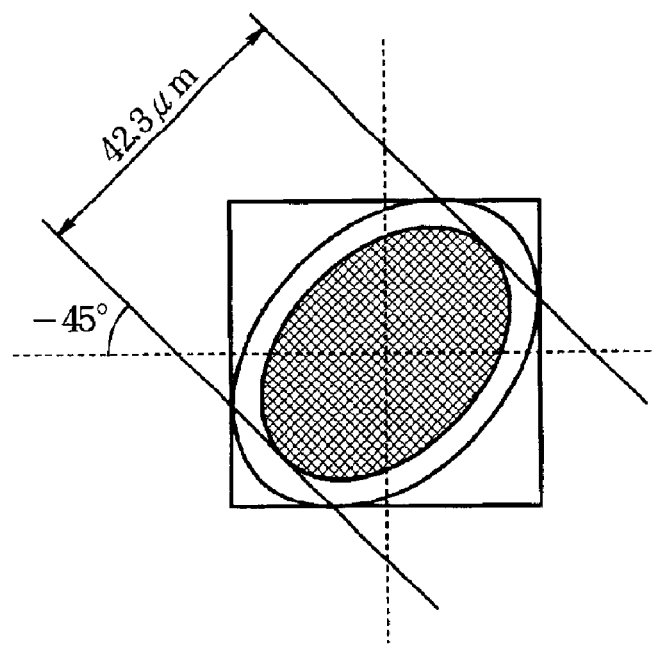
FIG. 5 illustrates a dot adjusted in size for a screen angle of −45°.

FIG. 5 shows an example of a dot distorted into an ellipse with a long axis perpendicular to the screen angle, which is −45°. The length of the long axis is the width of the dot when viewed in the screen-angle direction. If the measured width of the dot, represented by the white ellipse, is greater than 42.3 µm, the width-ratio parameter is calculated to reduce the width to 42.3 µm, as indicated by the hatched ellipse.

Figure 6:
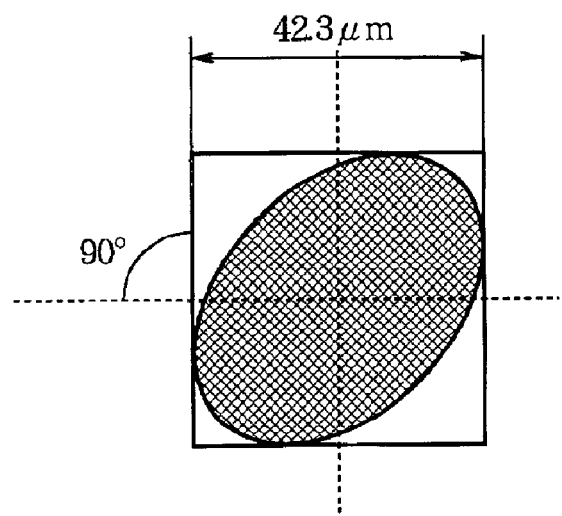
FIG. 6 illustrates the same dot adjusted in size for a screen angle of 90°.

FIG. 6 shows an example in which the screen angle is 90'. The measured dot has the same size and shape as in FIG. 5. In this case, the width of the dot as viewed in the screen-angle direction is already 42.3 µm, so a parameter value that leaves this width unchanged is chosen.

Figure 7:
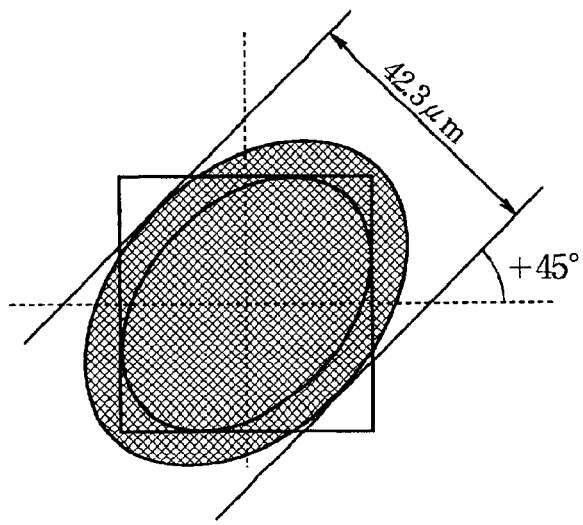
FIG. 7 illustrates the same dot adjusted in size for a screen angle of +450.

FIG. 7 shows an example in which the screen angle is +45°. The measured dot once again has the same size and shape as in FIG. 5. The width of the dot as viewed in the screen-angle direction is now less than 42.3 µm, so a parameter value that increases the width to 42.3 µm is calculated.

Figure 8:
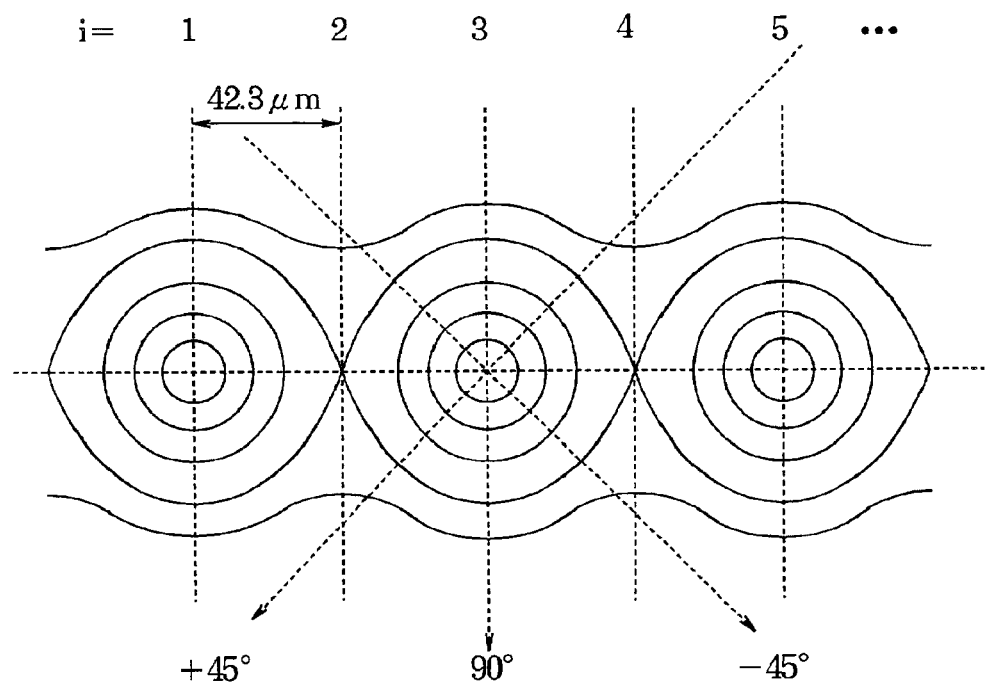
FIG. 8 illustrates a two-dimensional illumination pattern on the photosensitive drum in FIG. 1.
Figure 9A:
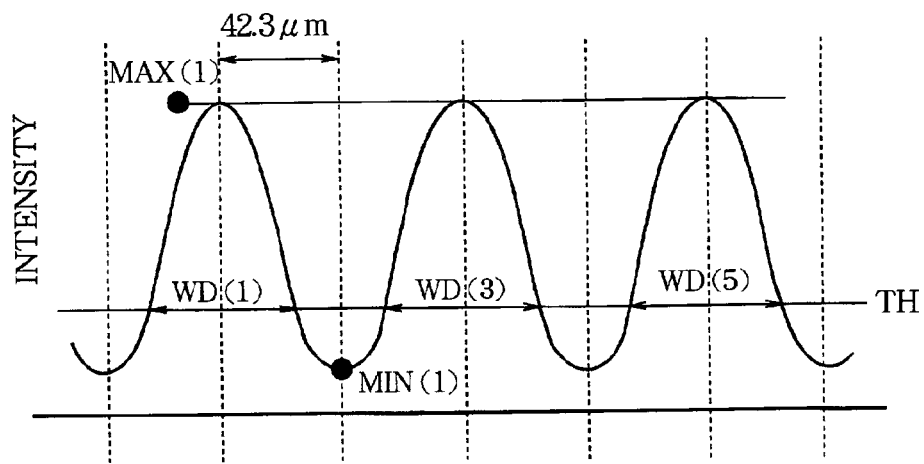
FIG. 9A illustrates a one-dimensional intensity profile derived from FIG. 8 with a screen angle of ±45°.
Figure 9B:
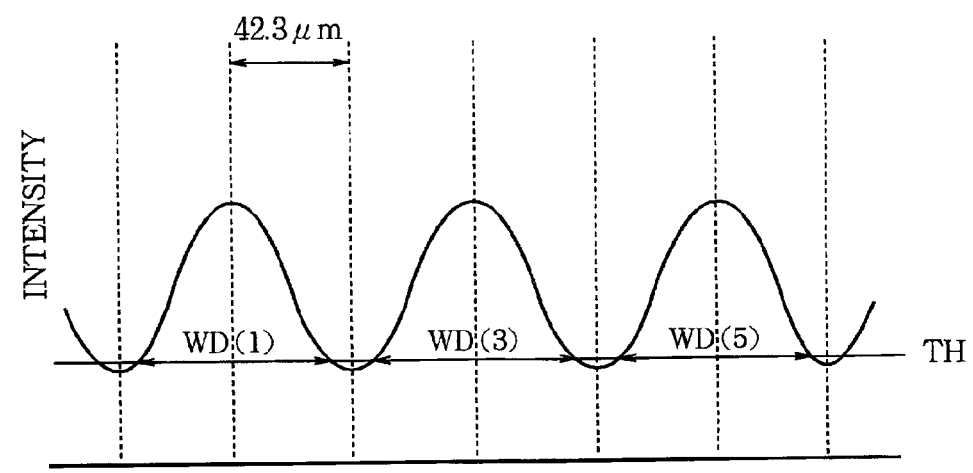
FIG. 9B illustrates a one-dimensional intensity profile derived from FIG. 8 with a screen angle of 90°.

FIG. 8 shows the two-dimensional intensity distribution of light emitted by a 600-dpi LED head 100 when every second dot in the LED array 112 is driven. The solid lines are equal-intensity contours. The dotted lines with arrowheads indicate screen angles of +45°, 90°, and −45°. FIG. 9A illustrates the one-dimensional intensity distribution in the screen-angle direction when the screen angle is either +45° or −45°. FIG. 9B indicates the one-dimensional intensity distribution in the screen-angle direction when the screen angle is 90°.

FIGS. 9A and 9B also indicate the widths WD(1), WD(3), WD(5) of the dots when the dot image is converted to a bi-level dot image by comparison with a threshold (TH)

such as $1/e^2$. Using $i_{max}$ as before to represent the total number of dots in the array, the average dot width WDavg can be calculated as in the following equation (2).

$$WDavg = \frac{\sum_{i}^{imax} WD(i)}{imax} \quad (2)$$

The width-ratio parameter values WDratio(i) can then be calculated from the following equation (3).

$$WDratio(i) = \frac{WD(i)}{WDavg} \times 100 - 50 \quad (3)$$

These width-ratio parameters WDratio(i) are used to modify the conventional parameters Pcorrect(i) described above and thereby obtain the compensation parameters Lcorrect(i) (i=1, 2, 3, ..., $i_{max}$). The width-ratio parameters WDratio(i) are not used to replace the conventional parameters Pcorrect(i), because if the conventional parameters Pcorrect(i) were to be completely ignored, the resulting differences in LED exposure energy would lead to obvious printing irregularities.

The first embodiment combines the parameters by weighting the width-ratio parameters WDratio(i), then subtracting the weighted parameter values from the Pcorrect(i) parameters. The weighting factor is a positive constant α less than one (α<1). The weighted parameters will be denoted WDcorrect(i) (i=1, 2, 3, ..., $i_{max}$). These calculations are described by the following equations (4 and 5).

$$WDcorrect(i) = \alpha \times WDratio(i) \quad (4)$$

$$Lcorrect(i) = Pcorrect(i) - WDcorrect(i) \quad (5)$$

The calculated compensation parameters Lcorrect(i) (i=1, 2, 3, ..., $i_{max}$) are stored at corresponding addresses in the memory unit 108, as indicated in Table 1, for example.

TABLE 1

Contents of memory unit in 1st embodiment

| Address | Stored value |
| --- | --- |
| 0 | Lcorrect(1) |
| Etc. | Lcorrect(2) |
|  | Etc. |

Since a color printer of the tandem type has a, different LED head 100 and photosensitive drum 107 for each of the four primary colors (Y, M, C, K), corresponding suffixes (Y, M, C, K) will be added to the reference numerals to distinguish these LED heads and photosensitive drums. For example, the LED head and photosensitive drum used for printing yellow dots will be referred to as the yellow LED head 100Y and yellow photosensitive drum 107Y.

The compensation parameters stored in the memory unit 108 in the yellow LED head 100Y will be denoted YLcorrect (i). Similarly, the compensation parameters stored in the memory units 108 in the other three LED heads 100M, 100C, 100K will be denoted MLcorrect(i), CLcorrect(i), and KLcorrect(i), respectively. The YLcorrect(i) parameter values are calculated for a screen angle of −45°, the MLcorrect (i) and KLcorrect(i) parameter values for a screen angle of +45°, and the CLcorrect(i) parameter values for a screen angle of 90°.

Before printing begins, the parameter values stored in the memory unit 108 in each LED head 100Y, 100M, 100C, 100K are transferred to the driving circuit 113 in the same LED head. The parameter values can be transferred when the printer's power is first switched on, and left stored in the driving circuit 113 until power is switched off. Alternatively, the parameter values can be transferred from the memory unit 108 to the driving circuit 113 before each page is printed. The advantage of transferring the parameter values once per page is that if a parameter value is corrupted in transfer by electrical noise, the resulting parameter error will affect only one page.

In subsequent printing, the exposure energy of each LED in LED head 100x(x=Y, M, C, K) is adjusted according to the corresponding parameter value xLcorrect(i). As noted above, the LED exposure energy can be adjusted by varying either the driving current or the duration for which the driving current is supplied.

As a result of these adjustments, in the electrostatic latent image of each primary color, all of the illuminated dots have approximately the same LED exposure energy, and all have approximately the same width as viewed in the screen-angle direction. When these images are developed, on each of the photosensitive drums 107Y, 107M, 107C, 107K, the developed toner dots comprise substantially similar amounts of toner and have substantially similar widths in the screen-angle direction. When the toner images are transferred to the printing medium, the resulting full-color printed image is free of obvious irregularities aligned in any of the various screen-angle directions.

Since the first embodiment attempts to equalize dot widths as viewed in the screen-angle direction but not in other directions, in a typical image, the width of the illuminated dots varies less in the screen-angle direction than in other directions. As noted above, variations aligned in the screen-angle direction tend to be more obvious than variations aligned in other directions. Accordingly, while maintaining approximate equality of LED exposure energy and thus of printing density, the first embodiment also adjusts the dot sizes so as to avoid width irregularities aligned in the directions in which such irregularities are most visible to the eye. The overall result is that image quality is improved, as compared with the prior art.

The first embodiment is not limited to screen angles of −45°, 90°, and +45°. Suitable width-ratio parameters and compensation parameters can be calculated for any screen angle.

In a variation of the first embodiment, dot widths are measured by use of the modulation transfer function (MTF). The MTF value of the i-th dot is defined by the following equation (6).

$$MTF(i) = \frac{MAX(i) - MIN(i)}{MAX(i) + MIN(i)} \quad (6)$$

MAX(i); and MIN(i) in the above equation (6) are the maximum and minimum values in the LED exposure intensity profile, illustrated by black dots in FIG. 9A. In this variation of the first embodiment, Lcorrect(i) is calculated by replacing WD(i) with MTF(i) in equations (2) and (3) above.

The second embodiment of the invention differs from the first embodiment in the way in which the compensation parameters are stored in the memory unit 108. In other respects the second embodiment is identical to the first embodiment.

In the first embodiment, the memory unit 108 in each LED head 100 stores compensation parameters for only a single screen angle. This scheme is suitable for a color printer of the tandem type, in which a separate LED head 100 and photosensitive drum 107 is provided for each primary color. In the second embodiment, the memory unit 108 stores several different sets of compensation parameters, calculated for different screen angles. This scheme is suitable not only for color printers of the tandem type, but also for color printers of the intermediate transfer type, in which a single LED head 100 and photosensitive drum 107 are used for all primary colors.

As in the first embodiment, it will be assumed that the screen angle is −45° for yellow, 90° for cyan, and +45° for magenta and black. The correction parameters are calculated for each color as described in the first embodiment. The calculated parameters will again be denoted YLcorrect(i) for yellow, MLcorrect(i) for magenta, CLcorrect(i) for cyan, and KLcorrect(i) for black. All four sets of parameters are stored in a single memory unit 108 at separate addresses, as indicated in Table 2, for example.

TABLE 2

Contents of memory unit in 2nd embodiment

| Address | Stored value |
| --- | --- |
| 0 | YLcorrect(1) |
| Etc. | YLcorrect(2) |
|  | Etc. |
| 10000 | MLcorrect(1) |
| Etc. | MLcorrect(2) |
|  | Etc. |
| 20000 | CLcorrect(1) |
| Etc. | CLcorrect(2) |
|  | Etc. |
| 30000 | KLcorrect(1) |
| Etc. | KLcorrect(2) |
|  | Etc. |

In the second embodiment, the compensation-parameter address register 110-1 in the LED head controller 110 stores a separate starting address for each primary color.

The operation of the second embodiment in a color printer of the tandem type will be described next. As in the first embodiment, this printer has four LED heads 100Y, 100M, 100C, 100K. The same compensation parameters are stored in the memory units 108 in all four LED heads.

Before printing begins, the LED head controller 110 transfers the yellow compensation parameters YLcorrect(i) (i=1, 2, . . . , $i_{max}$) from the memory unit 108 in the yellow LED head 100Y to the driving circuit 113 in the yellow LED head 100Y. If the compensation parameters are stored at the addresses indicated in Table 2, the LED head controller 110 sends the listed starting address (0) of the yellow compensation parameters to the memory unit 108 in this LED head 100Y, together with control and clock signals. The LED head controller 110 refers to the compensation-parameter address register 110-1 to obtain the starting address value.

In like manner, the LED head controller 110 transfers the magenta, cyan, and black compensation parameters from the memory units 108 to the driving circuits 113 in the corresponding LED heads 100M, 100C, 100K, referring to the compensation-parameter address register 110-1 for the starting address of each set of parameters.

After the compensation parameters have been transferred, printing proceeds as in the first embodiment, either the LED driving current or the driving time being controlled so that for each primary color, all illuminated dots have approximately the same width as viewed in the screen-angle direction, as well as receiving approximately the same exposure energy.

The second embodiment provides the same effects as the first embodiment, with the additional effect that the printer manufacturer has to manufacture, stock, and install only one type of LED head. Thus there is no risk that, for example, an LED head having only compensation parameters for printing yellow dots (with a screen angle of −45°) will mistakenly be installed in the position for printing magenta dots (with a screen angle of +45°).

In a variation of the second embodiment, the memory unit 108 stores only three sets of compensation parameters. One set of parameters is used for both magenta and black, which have the same screen angle (+45°). In the compensation-parameter address register 110-1 in the LED head controller 110, the same starting address is stored for both magenta and black.

In another variation, the compensation parameters are transferred from the memory units 108 to the driving circuits 113 at the beginning of each new page, as mentioned in the first embodiment.

The third embodiment differs from the second embodiment in the way in which the compensation parameters are stored in the memory unit 108. In other respects the third embodiment is identical to the second embodiment.

The memory unit 108 in the second embodiment, which stores a separate compensation parameter for each primary color for each LED, requires four times as much storage capacity as the memory unit 108 in the first embodiment, or three times as much storage capacity if the same compensation parameters are used for magenta and black. The third embodiment reduces the required storage capacity.

As explained in the first embodiment, the compensation parameters YLcorrect(i), MLcorrect(i), CLcorrect(i), KLcorrect(i) are calculated as follows, where Pcorrect(i) are the parameters that equalize the LED exposure energy, and YWDcorrect(i), MWDcorrect(i), CWDcorrect(i), and KWDcorrect(i) are the weighted width-ratio parameters for yellow. (−45°), magenta (+45°), cyan (90°), and black (+45°) respectively (i=1, 2, . . . , $i_{max}$).

YLcorrect(i)=Pcorrect(i)−YWDcorrect(i)

MLcorrect(i)=Pcorrect(i)−MWDcorrect(i)

CLcorrect(i)=Pcorrect(i)−CWDcorrect(i)

KLcorrect(i)=Pcorrect(i)−KWDcorrect(i)

Experiments have shown that the range of variation of the LED exposure intensity is approximately ±30%, while with a suitable weighting parameter α, the range of variation of the weighted width ratio is only approximately ±6%. Accordingly, the weighted width-ratio parameters can have a shorter bit length than the Pcorrect(i) parameters. If, for example, the bit length of the weighted width-ratio parameters is only half the bit length of the Pcorrect(i) parameters, storage space in the memory unit 108 can be saved by storing the Pcorrect(i) parameters and weighted width-ratio parameters instead of the Lcorrect(i) parameters, as indicated in Table 3.

TABLE 3

Contents of memory unit in 3rd embodiment (1)

| Address | Stored value |
| --- | --- |
| 0 | Pcorrect(1) |
| Etc. | Pcorrect(2) |
|  | Etc. |
| 10000 | YWDcorrect(1) |
| Etc. | YWDcorrect(2) |
|  | Etc. |

TABLE 3-continued

Contents of memory unit in 3rd embodiment (1)

| Address | Stored value |
|---|---|
| 15000 | MWDcorrect(1) |
| Etc. | MWDcorrect(2) |
|  | Etc. |
| 20000 | CWDcerrect(1) |
| Etc. | CWDcorrect(2) |
|  | Etc. |
| 25000 | KWDcorrect(1) |
| Etc. | KWDcorrect(2) |
|  | Etc. |

The storage-space requirement in Table 3 is only three-fourths that in Table 2.

As another example, in a 600-dpi color printer printing on A4-size paper with an LED array 112 comprising four thousand nine hundred ninety-two LEDs (4992 dots per line), if the LED exposure energy is adjusted in 1% steps, adjustment over a ±30% range (sixty-one steps) requires Pcorrect(i) parameter values comprising six bits each ($2^6$ = 64). For the weighted width-ratio parameters, adjustment in 1% steps over a ±6% range (thirteen steps) requires only four bits ($2^4$ = 16). The total number of bits that must be stored in the memory unit 108 is accordingly:

(6 bits×49992 dots)+(4×4 bits×4992 dots)=109,824 bits

With the storage scheme in Table 2, four six-bit parameters must be stored for each dot of each primary color. The total storage requirement is accordingly:

4×(6 bits×4992 dots)=119,801 bits

In this case, the third embodiment saves nearly ten thousand bits of storage space, as compared with the second embodiment.

A further saving in storage space can be made by storing one weighted width-ratio parameter for each glass cylinder (lens) in the lens array 105, instead of one weighted width-ratio parameter for each dot (LED) in the LED array 112. The reason is that width distortion is caused by the lens array 105, not by the LED array 112, and since each glass cylinder in the lens array 105 serves several dots (LEDs), all of these dots will be distorted in the same way.

For example, in a 600-dpi printer, if the diameter of each glass cylinder in the lens array 105 is nine-tenths of a millimeter (0.9 mm), each glass cylinder or lens serves approximately twenty-one dots.

(0.9 mm)/(42.3 μm)=21.276 dots/lens

If one weighted width-ratio parameter value is stored per lens for each primary color, the amount of width-ratio parameter data is reduced by a factor of twenty-one. The reduction can be effected by storing only every twenty-first weighted width-ratio parameter (for example, YWDcorrect (11), YWDcorrect(32), YWDcorrect(53), . . . for the primary color yellow), or by storing the average value of twenty-one consecutive weighted width-ratio parameters (for example, the average of YWDcorrect(1), YWDcorrect(2), . . . , YWDcorrect(21) for the first lens in the yellow LED head 100Y). Table 4 shows an example in which the former scheme is adopted.

TABLE 4

Contents of memory unit in 3rd embodiment (2)

| Address | Stored value |
|---|---|
| 0 | Pcorrect(1) |
| Etc. | Pcorrect(2) |
|  | Etc. |
| 10000 | YWDcorrect(11) |
| Etc. | YWDcorrect(32) |
|  | Etc. |
| 10500 | MWDcorrect(11) |
| Etc. | MWDcorrect(32) |
|  | Etc. |
| 11000 | CWDcorrect(11) |
| Etc. | CWDcorrect(32) |
|  | Etc. |
| 11500 | KWDcorrect(11) |
| Etc. | KWDcorrect(32) |
|  | Etc. |

The storage scheme in Table 4 requires only the following number of bits:

(6 bits×49992 dots)+(4×4 bits×4992 dots)/21=33,756 bits

Compared with the second embodiment, the storage requirement is reduced by a factor of nearly four (33,756/119,801=0.28).

Figure 10:
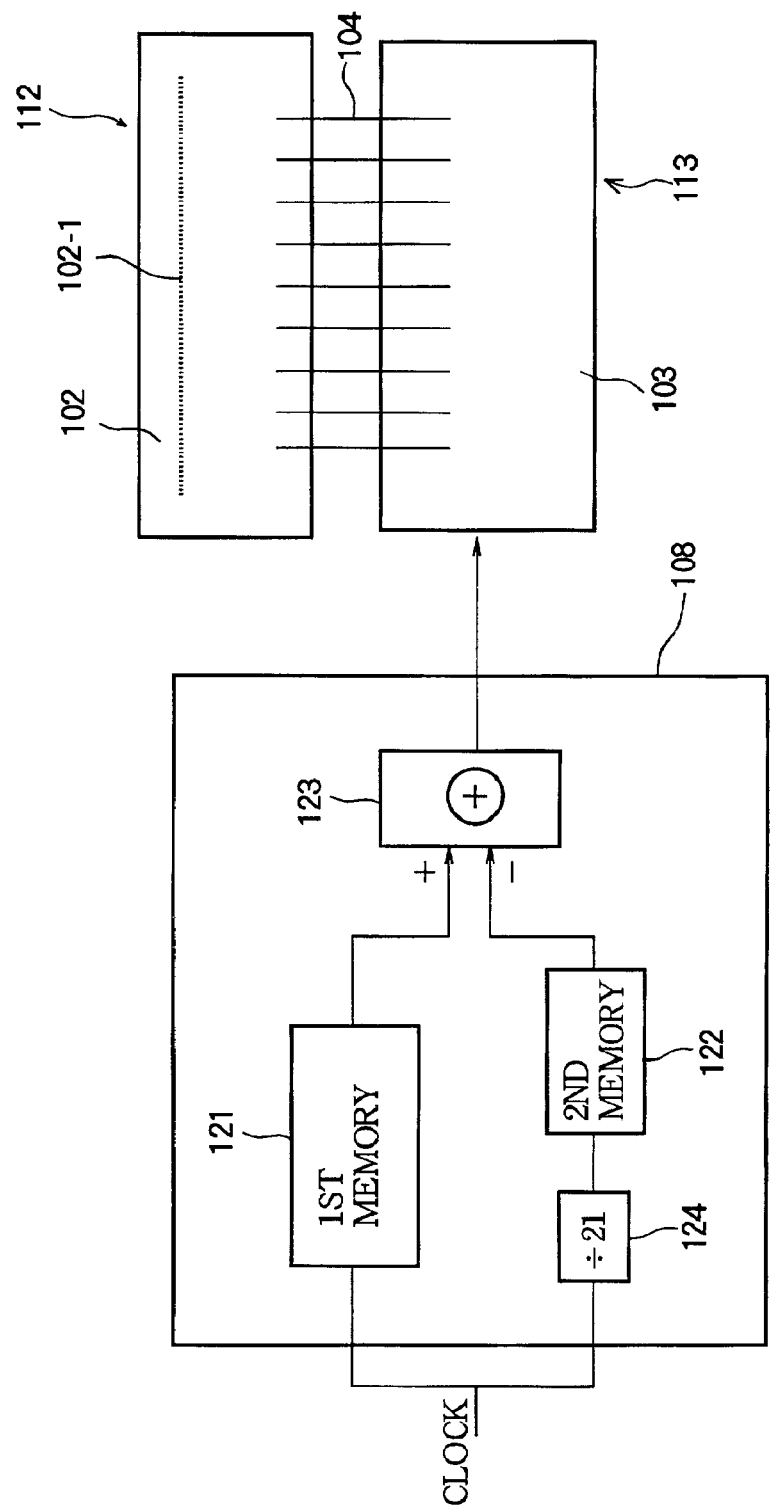
FIG. 10 is a block diagram illustrating the internal structure of the memory unit in a third embodiment of the invention.

When the storage scheme in Table 4 is adopted, the memory unit 108 has, for example, the internal structure shown in FIG. 10, comprising a first memory 121 storing the Pcorrect(i) parameter values, a second memory 122 storing the YWDcorrect(i), MWDcorrect(i), CWDcorrect(i), and KWDcorrect(i) parameter values, an arithmetic unit 123 that subtracts a value read from the second memory 122 from a value read from the first memory 121, and a modulo-twenty-one or divide-by-twenty-one counter 124 coupled to the second memory 122. Values stored at successive addresses in the first memory 121 and second memory 122 are read out in response to a clock signal. The clock signal is supplied directly to the first memory 121, and the clock frequency is divided by twenty-one by the counter 124 for input to the second memory 122.

Before printing begins, the LED head controller 110 sends commands to the memory unit 108 that cause the arithmetic unit 123 to calculate the compensation parameter values and send them to the driving circuit 113.

First, the LED head controller 110 supplies the starting address of the Pcorrect(i) parameters to the first memory 121, and the starting address of the relevant weighted width-ratio parameters to the second memory 122. In the yellow LED head 100Y, for example, the first memory 121 receives the address (0) of the Pcorrect(1) parameter, and the second memory 122 receives the address (10000) of the YWDcorrect(11) parameter. The arithmetic unit 123 receives Pcorrect(1) and YWDcorrect(11), and calculates YLcorrect(1) as the difference between them, Pcorrect(1)–YWDcorrect(11). This value Lcorrect(1) is sent to and stored in the driving circuit 113.

Next, the LED head controller 110 supplies clock pulses to the memory unit 108. In response to the first twenty clock pulses, the first memory 121 successively outputs Pcorrect (2), Pcorrect(3), . . . , Pcorrect(21). The arithmetic unit 123 subtracts YWDcorrect(11) from each of these values to obtain YLcorrect(2), YLcorrect(3), . . . , YLcorrect(21), and sends these values to the driving circuit 113.

At the twenty-first clock pulse, the divide-by-twenty-one counter 124 sends a pulse to the second memory 122, causing the second memory 122 to begin output of the next weighted width-ratio parameter YWDcorrect(32). The arithmetic unit 123 subtracts this value from the next twenty-one values output from the first memory 121 (Pcorrect(22), Pcorrect(23), . . . , Pcorrect(42)) to obtain further compensation parameters (YLcorrect(22), YLcorrect(23), . . . , YLcorrect(42)).

Continuing in this way, the memory unit 108 generates and outputs all of the compensation parameter values up to YLcorrect($i_{max}$). The compensation parameters in the magenta, cyan, and black LED heads 100M, 100C, 100K are generated in similar fashion, the only difference being the initial address supplied to the second memory 122.

Once these parameter values have been stored in the driving circuit 113 in each LED head, the third embodiment operates in the same way as the first and second embodiments. The third embodiment accordingly provides the same effects as the second embodiment, but the reduced storage requirements enable the LED heads to be manufactured at a lower cost.

In a variation of the third embodiment, the memory unit 108 only stores the parameter values Pcorrect(i) and xWDcorrect(i) (x=Y, M, C, K). The functions of the arithmetic unit 123 and counter 124 are moved into the LED head controller 110. The LED head controller 110 reads the parameters stored in the memory unit 108, calculates the compensation parameter values xLcorrect(i) (x=Y, M, C, K), and transfers the appropriate compensation parameters to the driving circuit 113 in each LED head.

Figure 11:
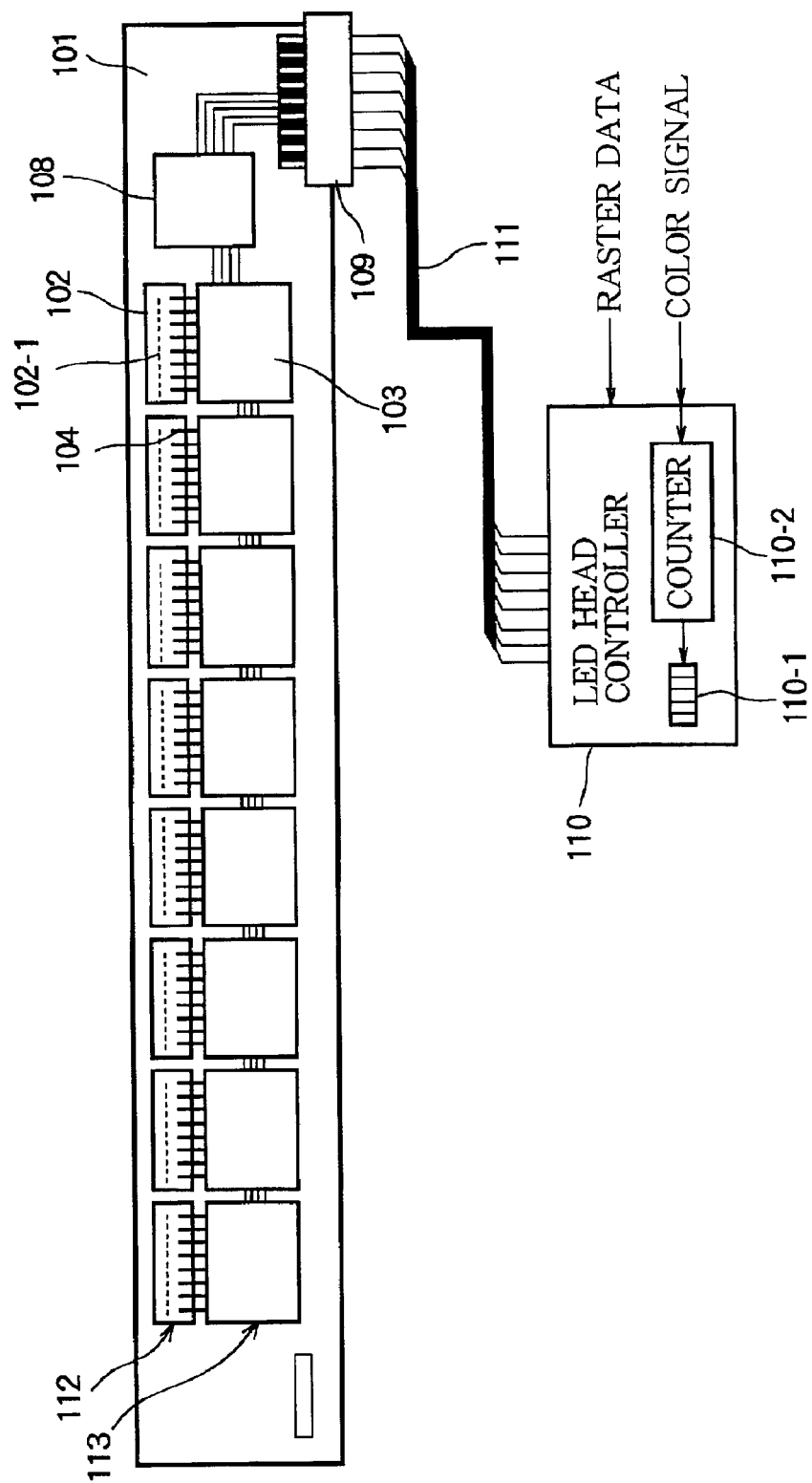
FIG. 11 is a plan view of the printed wiring board in an LED head illustrating a variation of the second and third embodiments.

The second and third embodiments have been described in relation to a color printer of the tandem type, but they can also be used in a color printer of the intermediate transfer type, having only a single LED head 100 and photosensitive drum 107. Referring to FIG. 11, the LED head controller 110 in this case also has a divide-by-four counter 110-2 that selects one of four addresses stored in the LED head controller 110. In the second embodiment these four addresses are the addresses of the yellow, magenta, cyan, and black compensation parameters (e.g., the addresses 0, 10000, 20000, and 30000 in Table 2). In the third embodiment, these four addresses are the addresses of the yellow, magenta, cyan, and black weighted width-ratio parameters (e.g., the addresses 10000, 10500, 11000, and 11500 in Table 4).

For each page printed in full color, the LED head controller 110 transfers compensation parameters from the memory unit 108 to the driving circuit 113 four times. First, the yellow compensation parameters are transferred; then the LED head controller 110 sends yellow raster data to the driving circuit 113. The resulting electrostatic latent image is developed with yellow toner and transferred to the intermediate transfer drum (not visible). Next, the magenta compensation parameters are transferred to the driving circuit 113; then the LED head controller 110 sends magenta raster data to the driving circuit 113. The resulting electrostatic latent image is developed with magenta toner and supplied to the intermediate transfer drum. Cyan and black images are formed and transferred in the same way, after which the full-color image is transferred from the intermediate transfer drum to paper.

The invention can also be practiced in color printers using the transfer drum method or batch multi-development method of color printing.

Those skilled in the art will recognize that further variations are possible within the scope claimed below.

What is claimed is:

1. An image-writing device for writing an electrostatic latent image onto an image-receiving body, the image including dots specified by data in accordance with a screen angle, comprising:

a plurality of writing elements for writing the dots by illuminating the image-receiving body;

a memory storing compensation parameters; and a driver for driving the writing elements according to said data by supplying the writing elements with energy modified according to the compensation parameters, wherein the compensation parameters give the dots substantially identical widths in a direction perpendicular to the screen angle.

2. The image-writing device of claim 1, wherein said memory stores at least two different sets of compensation parameters corresponding to different screen angles.

3. An image-forming apparatus comprising:

at least one image-receiving body;

at least one image-writing device as described in claim 1, for writing an image including dots aligned with respect to said screen angle onto said image-receiving body; and a controller for controlling the image-writing device.

4. The image-forming apparatus of claim 3, comprising at least two image writing devices writing respective images including dots aligned at different screen angles, the memory in each of said at least two image-writing devices storing different compensation parameters corresponding to said different screw angles.

5. The image-forming apparatus of claim 3, comprising at least two image-writing devices writing respective images including dots aligned at different screen angles, wherein the memory in each of said at least two image-writing devices stores at least to sets of compensation parameters corresponding to said different screen angles, and the controller selects one set of compensation parameters for use by said driver.

6. The image-writing device of claim 1, wherein said widths are total widths as viewed at the screen angle direction.

7. An image-writing device for writing an electrostatic latent image onto an image-receiving body by illuminating the image-receiving body, the image including dots aligned with respect to a screen angle, comprising:

a plurality of light-emitting elements for emitting light for writing the dots;

a plurality of lenses for focusing the light emitted by the light-emitting elements onto the image-receiving body;

a memory storing a first plurality of parameters corresponding to the light-emitting elements and a second plurality of parameters corresponding to the lenses; and a driver for driving the light-emitting elements according to the first plurality of parameters and the second plurality of parameters, thereby causing the dots to have substantially uniform widths as viewed at the screen angle.

8. An image-forming apparatus comprising:

at least one image-receiving body;

at least one image-writing device as described in claim 7, for writing an image including dots aligned with respect to said screen angle onto said image-receiving body; and a controller for controlling the image-writing device, combining said first plurality of parameters with said second plurality of parameters to obtain compensation parameters, and transferring the compensation parameters to said driver.

9. The image-writing device of claim 7, wherein said widths are total widths as viewed at the screen angle direction.

10. An image-writing device for writing an electrostatic latest image onto an image-receiving body by illuminating the image-receiving body, the image including dots aligned with respect to a screen angle, comprising:

a plurality of light-emitting elements for emitting light for writing the dots;

a plurality of lenses for focusing the light emitted by the light-emitting elements onto the image-receiving body;

a memory storing a first plurality of parameters corresponding to said light-emitting elements, for equalizing exposure energy of the dots, and a second plurality of parameters corresponding to different screen angles; and a driver for driving the light-emitting elements according to the first plurality of parameters and the second plurality of parameters, thereby causing the dots to have substantially uniform widths as viewed at the screen angle.

11. The image-writing device of claim 10, wherein the second plurality of parameters also correspond to said light-emitting elements, the second plurality of parameters including a separate parameter for each combination of any one of said light-emitting exponents and any one of said screen angles.

12. The image-writing device of claim 10, wherein the second plurality of parameters also correspond to said lenses, the second plurality of parameters including a separate parameter for each combination of any one of said lenses and any one of said screen angles.

13. The image-writing device of claim 10, wherein said widths are total widths as viewed at the screen angle direction.

14. An image-forming apparatus comprising:

at least one image-receiving body;

at least one image-writing device as described in claim 10, for writing an image including dots aligned with respect to said screen angle onto said image-receiving body; and a controller for controlling the image-writing device, combining said first plurality of parameters with said second plurality of parameters to obtain compensation parameters, and transferring the compensation parameters to said driver.

15. An image-writing device for writing an image onto an image-receiving body, the image including dots aligned with respect to a screen angle, wherein the image-writing device controls the sizes of the dots so that the dots vary in width less when viewed parallel to said screen angle than when viewed in any other direction.

16. An image-forming apparatus comprising:

an image-receiving body; and the image-writing device of claim 15, for writing an image including dots aligned with respect to said screen angle onto said image-receiving body.

17. A method of controlling an image-writing device having a plurality of light-emitting elements for writing an electrostatic latent image onto a photosensitive body and a plurality of lenses for focusing light emitted by the light-emitting elements onto the photosensitive body, the image including illuminated dots specified by data in accordance with a certain screen angle, comprising the steps of:

controlling energy supplied by the light-emitting elements so that the photosensitive body receives approximately identical illumination energy from all of the light-emitting elements; and further controlling the energy supplied by the light-emitting elements so that said illuminated dots have approximately equal widths when viewed at the screen angle.

18. The method of claim 17, wherein said step of farther controlling includes the use of different compensation parameter for different screen angles.

19. The method of claim 17, wherein said step of further controlling includes the use of different compensation parameters for different lenses in said plurality of lenses.

20. The method of claim 17, wherein said width are total widths as widths at the screen angle direction.

21. A method of controlling an image-writing device having a plurality of light-emitting elements for writing an electrostatic latent image onto a photosensitive body and a plurality of lenses for focusing light emitted by the light-emitting elements onto the photosensitive body, the image including illuminated dots aligned at a certain screen angle, comprising the steps of:

storing a first plurality of parameters, corresponding to respective light-emitting elements, in a memory;

storing a second plurality of parameters, corresponding to respective lenses, in said memory;

combining the first plurality of parameters with the second plurality of parameters to obtain compensation parameters corresponding to respective light-emitting elements; and driving the light-emitting elements according to the compensation parameters.

22. The method of claim 21, wherein said step of driving is carried cut so that the photosensitive body receives approximately identical illumination energy from all of the light-emitting elements, and said illuminated dots have approximately equal widths when viewed at said screen angle.

* * * * *